Sept. 8, 1970          H. F. SCHWEDE          3,528,000
NUCLEAR RESONANCE WELL LOGGING METHOD AND APPARATUS
Filed March 5, 1954          5 Sheets-Sheet 3
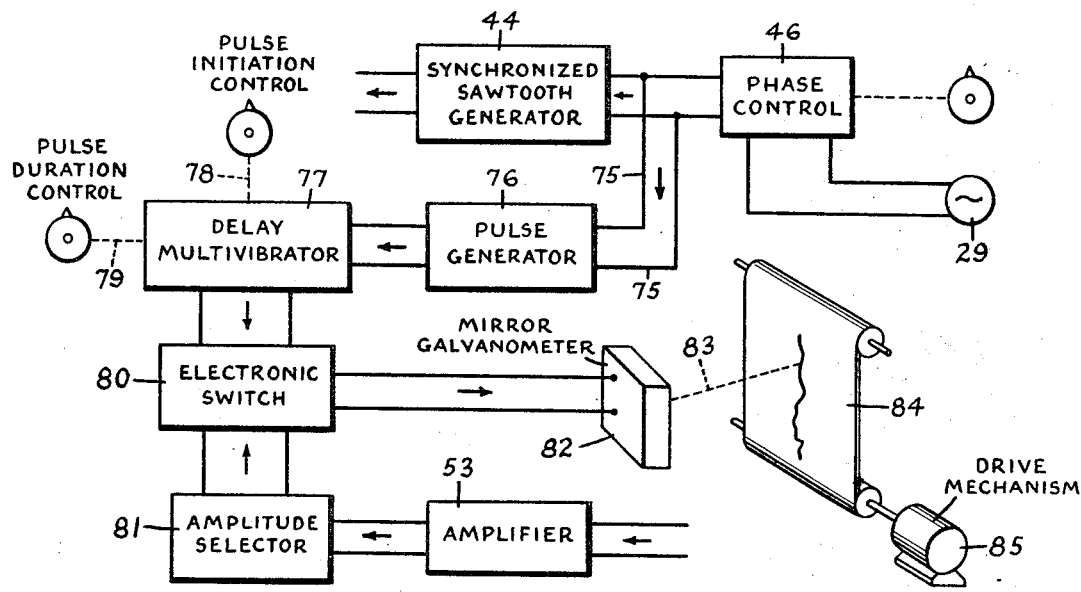
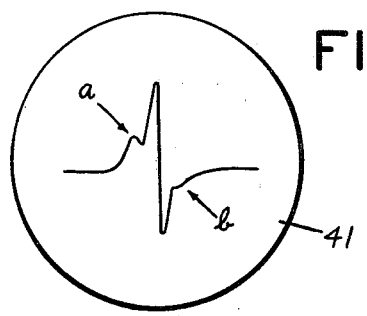
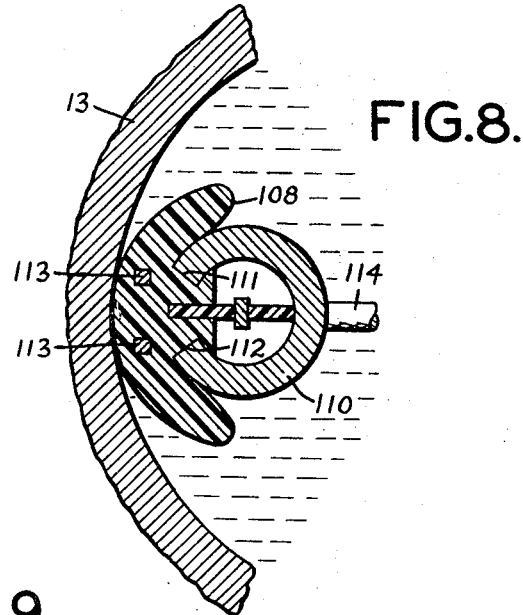
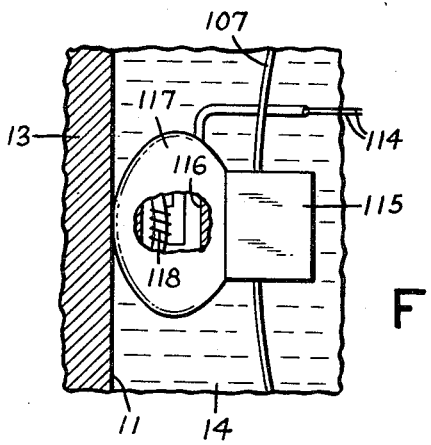
INVENTOR
HAROLD F. SCHWEDE
BY
Campbell, Brumbaugh, *****
HIS ATTORNEYS

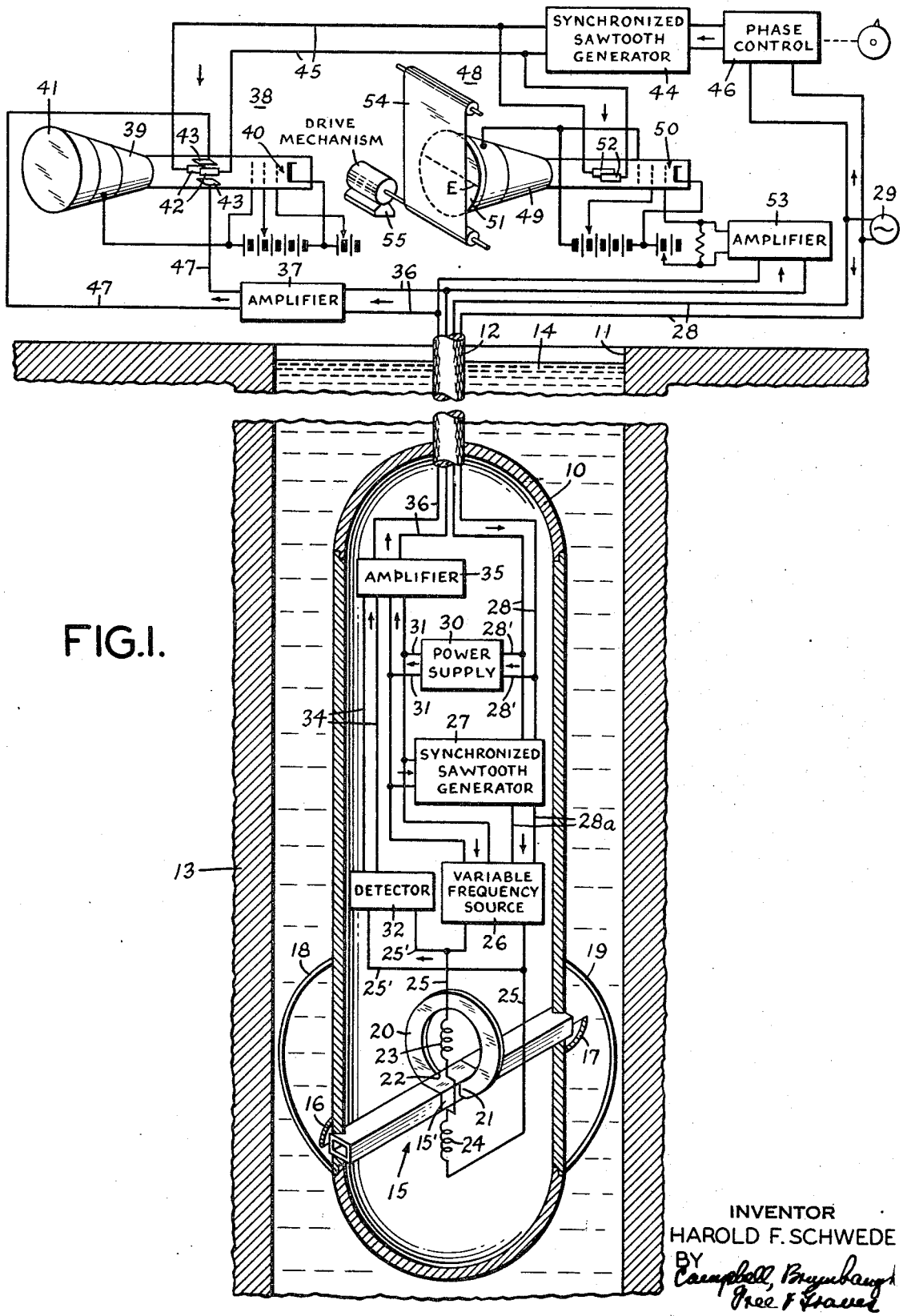

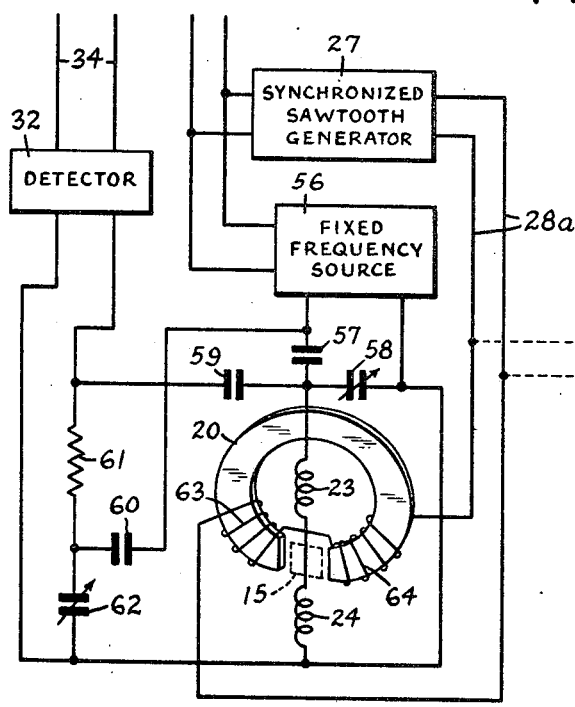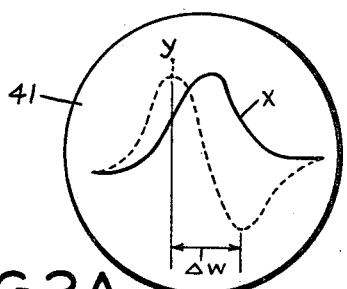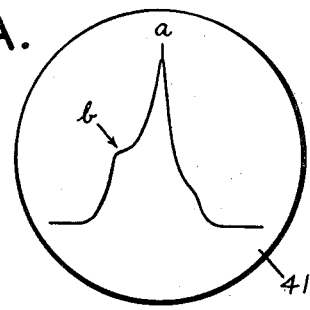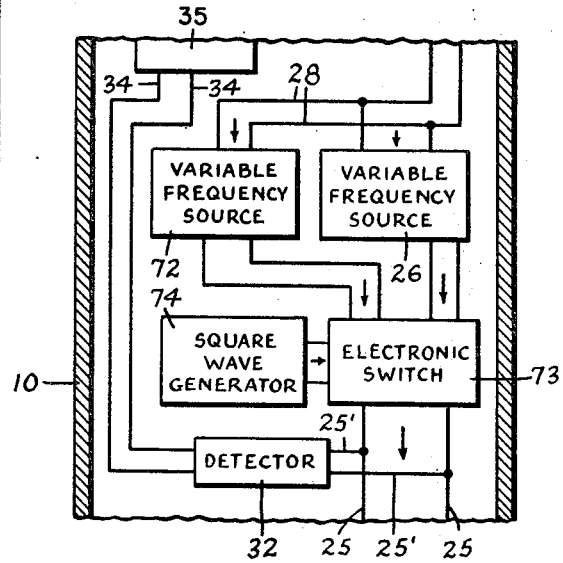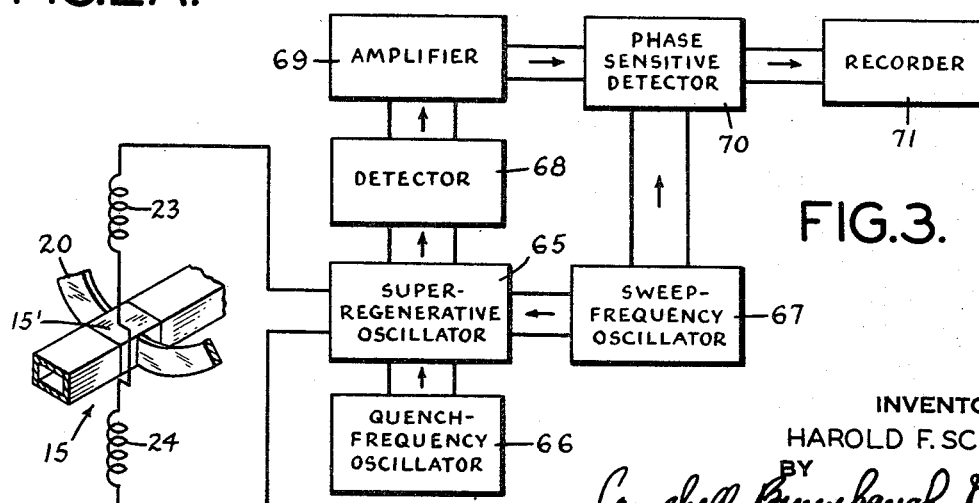

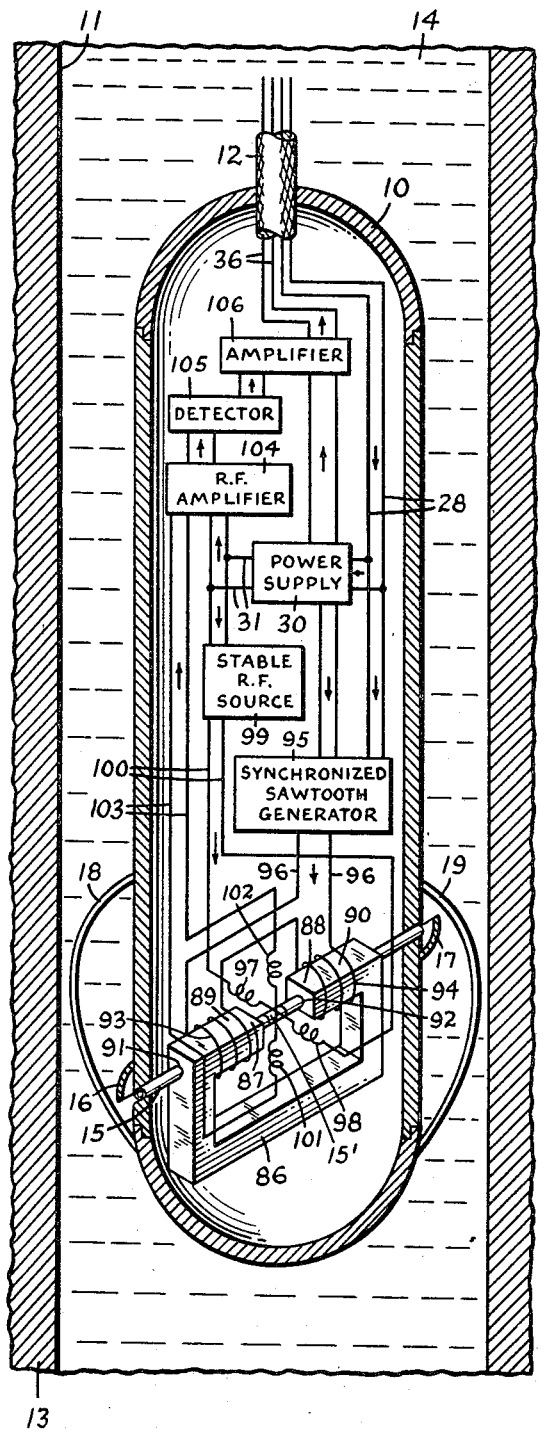
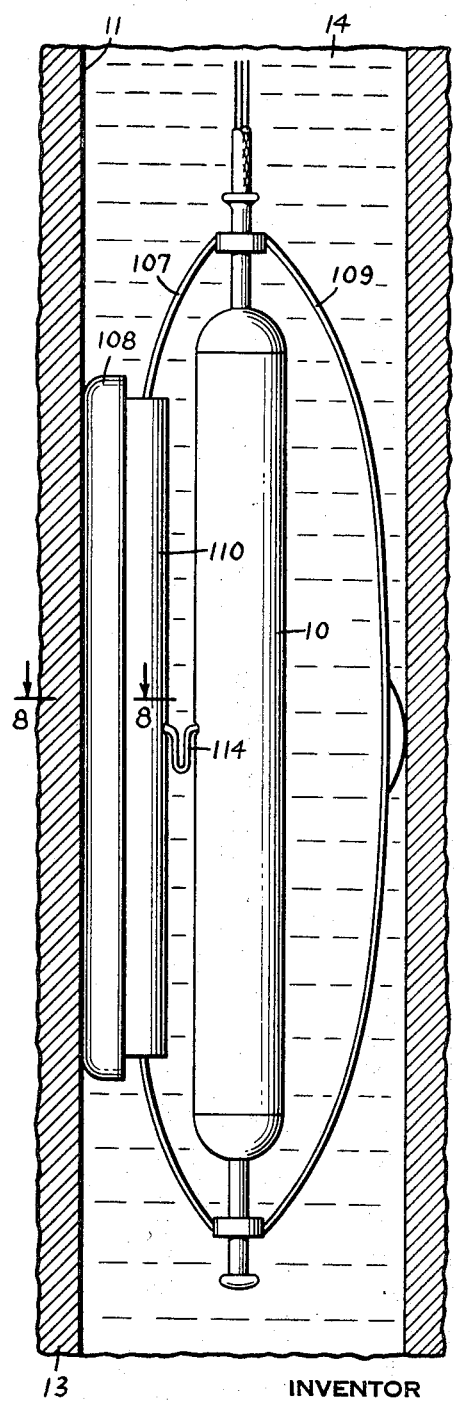

Sept. 8, 1970 H. F. SCHWEDE 3,528,000
NUCLEAR RESONANCE WELL LOGGING METHOD AND APPARATUS
Filed March 5, 1954 5 Sheets-Sheet 5

INVENTOR
HAROLD F. SCHWEDE
BY
Campbell, Brumbaugh, Free&Graw
HIS ATTORNEYS

United States Patent Office 3,528,000
Patented Sept. 8, 1970

3,528,000
NUCLEAR RESONANCE WELL LOGGING
METHOD AND APPARATUS
Harold F. Schwede, Redding, Conn., assignor, by mesne assignments, to Schlumberger Well Surveying Corporation, Houston, Tex., a corporation of Texas
Filed Mar. 5, 1954, Ser. No. 414,379
Int. Cl. G01n 22/78
U.S. Cl. 324—.5                                   24 Claims This invention relates to methods and apparatus for well logging and, more specifically, pertains to novel methods and apparatus for obtaining qualitative data concerning the earth formations traversed by a well or bore hole.

It is a principal object of the present invention to provide novel methods and apparatus for obtaining qualitative logs of the earth formations traversed by a bore hole.

The invention may be better understood by first considering the following discussion relative to the physical phenomenon involved. This discussion is presented solely to enable an understanding of the invention and is not itended as a rigorous and complete theoretical analysis. Thus, it is not to be construed in any way as limiting the scope of the invention.

Various measurements relating to studies of the nature of atoms indicate that some nuclei possess an intrinsic magnetic field. More specifically, each of these nuclei act as if there were a minute bar magnet or magnetic dipole, at the location of the nucleus which is spinning about a longitudinal axis through its end poles. If such a nucleus is exposed to an external magnetic field, the nucleus precesses, that is, the direction of the longitudinal axis of the magnetic dipole describes a conical surface about the field direction.

Experiments have revealed that this precession occurs at a frequency, usually referred to as a Larmor frequency, related to the particular atom under investigation and the strength of the magnetic field. By introducing a second magnetic field oriented at right angles to the first-mentioned field and alternating in intensity at the Larmor frequency, nuclear precession may be sustained. In other words, nuclear magnetic resonance occurs between the processing nucleus and the applied alternating field.

It is thus possible to determine the identity of a great many different atoms through the use of the nuclear magnetic resonance phenomenon. Although such resonance occurs in atoms of a particular element at a field strength and a Larmor frequency of given values, a slight deviation has been observed according to the environment or compound in which the element is found. Thus, various compounds containing a particular element for which nuclear resonance is observed may be distinguished from one another.

While the foregoing explanation is greatly over-simplified, it should provide an adequate basis for an understanding of the mode of operation of the present invention which has for one of its objects the provision of novel methods of logging a well or bore hole employing nuclear magnetic resonance techniques.

The novel method embodying the invention is adapted to the investigation of the composition of the earth formations traversed by a bore hole. According to the invention, a constituent material of the earth formations is subjected to a magnetic field having at least one component alternating in intensity at a definable frequency. An indication is effected upon the occurrence of nuclear magnetic resonance with this definable frequency.

More particularly, the applied magnetic field is comprised of first and second components oriented transversely relatively to one another. The first field component is of definable intensity and the second is of the aforesaid definable frequency. One of the two definable quantities just mentioned is periodically varied over a selected range while the other is substantially fixed so that nuclear magnetic resonance may occur for a particular element. An indication is produced in response to the occurrence of such resonance.

According to a specific embodiment of the method of the present invention, the first magnetic field component is fixed in intensity and the frequency of the second magnetic field component is varied periodically. Nuclear magnetic resonance is indicated by an absorption of energy from the second field, or by the presence of a magnetic field that alternates in intensity at the resonance frequency and which has a component oriented transversely to both the first and second magnetic field components.

In another embodiment of the invention, the intensity of the first magnetic field component is varied periodically at a frequency lower than an expected nuclear resonance frequency, and the frequency of the second field component is maintained substantially fixed. Indications of nuclear magnetic resonance may be indicated in the same manner as in the preceding embodiment.

In accordance with a further embodiment, the second field component alternating at a nuclear resonance frequency is applied in the form of pulses, the time durations of which are short as compared with the total relaxation time, i.e., the time in which the magnetic moment of the entire spin ensemble can decay. Upon cessation of the pulses, a non-equilibrium configuration of magnetic moments remains in which the moment vectors precess freely. The constructive interference of these moment vectors gives rise to observable spontaneous nuclear induction signals called "spin echoes." By measuring echo amplitudes, direct and accurate measurements may be made of relaxation times, which enable different molecules containing common atoms to be readily distinguished from one another. This information also makes it possible for different nuclei and different environments to be identified.

In another embodiment, a sample of the material under observation is irradiated with energy at a frequency for magnetic resonance with one nuclear specie, while at least one other nuclear specie having a different resonance frequency is being detected in the sample.

The method in accordance with the present invention for logging the earth formations traversed by a bore hole may be employed in either of two ways. If the bore hole is filled with a drilling mud, the mud itself may be investigated in search of hydrocarbons that may have seeped into the mud from hydrocarbon-bearing formations. The mud may also be examined for the presence of other nuclei. Whether the bore hole is mud filled or not, the constituent materials of the formations may be examined in situ.

To carry out the above-defined novel method of logging, it is within the contemplation of the present invention to provide novel logging apparatus of the nuclear resonance type which is especially adapted for analyzing substances in relatively inaccessible places, such as earth formations traversed by a bore hole.

Yet another object of the present invention is to provide novel well logging apparatus of the nuclear resonance type for deriving an informative log of the earth formations traversed by a well or bore hole and which is capable of distinguishing among various compounds containing atoms of the same element.

A further object of the present invention is to provide novel nuclear resonance type well logging apparatus for determining the presence or absence of hydrocarbons in the earth formations traversed by a bore hole.

A still further object of the invention is to provide novel methods and means for determining the presence of elements associated with hydrocarbon-bearing earth formations.

Still another object of the invention is to provide novel well logging methods and apparatus of the above character which utilize the so-called "spin echoes" effect in nuclear magnetic resonance phenomena.

Logging apparatus in accordance with the present invention is adapted to investigate the composition of the earth formations traversed by a bore hole and comprises means operable in the bore hole for applying a first magnetic field to constituent material of the formations. This field has a major component directed along a given axis and of a definable intensity. A second magnetic field is applied to the aforesaid constituent material with its major component directed along an axis substantially transverse to the given axis. The second field has an alternating intensity of definable frequency. In order to produce nuclear magnetic resonance phenomena, one of the two definable quantities just mentioned is periodically varied over a selected range, while the other is substantially fixed so that a nuclear magnetic resonance phenomenon occurs within the selected range of variation for a particular element in the constituent material under investigation. Means are provided for indicating the occurrence of such nuclear magnetic resonance, thereby to denote the presence of the particular element.

In one embodiment of the invention, the first magnetic field is fixed in its intensity and the frequency of the second field is varied over a selected range of frequencies during recurrent intervals. To that end, a source of energy of periodically varying frequency is coupled to induction coils which provide the second field. An indicator is coupled to the output of the source. The occurrence of nuclear resonance during each of the recurrent intervals is accompanied by maximum absorption of energy from the source. The latter phenomena are shown by the indicator.

Another embodiment of the present invention comprises means for periodically varying the intensity of the first field at a frequency much lower than an expected resonance frequency. The frequency of the second field is maintained substantially fixed. Induction pickup means is disposed adjacent the material under investigation with its magnetic axis transverse to the plane defined by the directions of the first and second magnetic field. Accordingly, nuclear resonance results in the induction of a current in the pickup means and an indicator coupled to the pickup means denotes this occurrence.

Where indications of "spin echoes" are sought, according to the invention, the intensity of the first field and the frequency of the second field are maintained constant, but the latter is applied in the form of successive intense, short pulses at pulse width $t_w < \tau < T_1$ and $T_2$, where $\tau$ is the time interval between pulses and $T_1$ and $T_2$ are the relaxation times which determine the rates at which nuclear magnetic resonance phenomena are damped out by exchange of energy between the nuclei and their surroundings. This times $T_1$ and $T_2$ are sometimes called the longitudinal and transverse relaxation times, respectively.

The inductive coil which is an inductive relation to the sample is first excited by the applied pulses and thereafter receives spontaneous radio fraquency signals (echo-signals) at the Larmor frequency due to the precessing nuclei. The analysis of observed echo signals yields direct information about $T_1$ and $T_2$. Since, in the echo technique the intense pulses of the alternating field provide a broad spectrum of frequencies, free induction signals deviating from exact resonance may be observed. Hence, this technique is highly suitable as a fast and stable method in searching for unknown resonances characteristic of particular atoms in different environments. Furthermore, the requirement for uniformity of the magnetic fields, particularly the first polarizing field, over a given volume of material in a sample, is less stringent.

According to a specific aspect of the instance invention, the mud column is investigated in search of hydrocarbons to be found therein due to seepage from hydrocarbon-bearing formations. Such hydrocarbons are, of course, a constituent material of the formations and nuclear resonance may occur in a selected one of their elements. The first and second magnetic fields may be applied to samples of the mud column as the means for producing these fields traverses the bore hole.

In accordance with another particular aspect of the invention, the formations themselves are examined. Accordingly, the first and second magnetic fields are applied to constituent material of the formation in situ.

The novel features of the present invention are set forth with particularity in the appended claims. The present invention, both as to its organization and manner of operation, together with further objects and advantages thereof, may best be understood by reference to the following description taken in connection with the accompanying drawings in which:

FIG. 1 is a schematic representation of well logging apparatus of the nuclear resonance type constructed in accordance with the present invention shown in operative association with a bore hole;

FIG. 1A is a front view, drawn to an enlarged scale, of the viewing screen of the indicator portion of the apparatus shown in FIG. 1;

FIGS. 2, 3, 4 and 5 are circuit modifications of the apparatus illustrated in FIG. 1;

FIGS. 2A and 2B illustrate representative curves that might be produced on the viewing screen with the form of circuit shown in FIG. 2;

FIG. 6 is a schematic representation of another embodiment of the present invention;

FIG. 7 is a view in elevation of well logging apparatus constructed in accordance with yet another embodiment of the instant invention;

FIG. 8 is a sectional view taken along line 8—8 of FIG. 7;

FIG. 9 represents a modification of the apparatus shown in FIG. 7;

Figure 11:
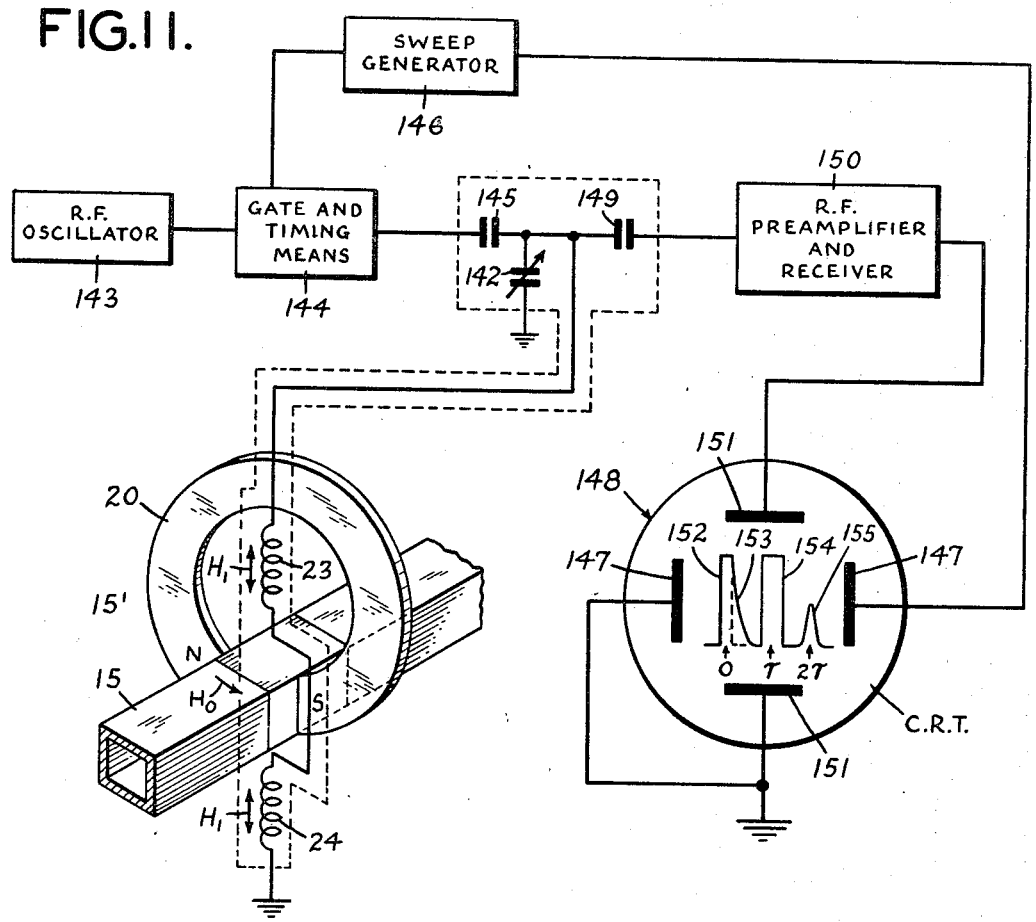
FIG. 11 is a schematic diagram of a modification utilizing so-called "spin echoes" in nuclear magnetic resonance well logging.

In FIG. 1 of the drawings, the nuclear magnetic resonance type well logging apparatus of the present invention is shown to comprise a pressure-tight housing 10 suspended in a bore hole 11 by a cable 12. The bore hole 11 traverses earth formations 13 and contains a drilling fluid 14, such as a water base mud. The housing 10 is lowered and raised in the bore hole 11 by means of the cable 12 in cooperation with a motor driven winch (not shown) in the usual manner.

Although the hydrostatic pressure of mud column 14 in the bore hole 11, in general, tends to prevent the entry of hydrocarbons and other fluids from the formations 13 into the bore hole, as is well known, seepage of the hydrocarbons into the mud column does occur. Hence, some trace of such hydrocarbons with other connate fluids usually may be found opposite their formations of origin and the apparatus of FIG. 1 may be employed to examine the drilling mud for these constituent elements of formations 13 in the form of cuttings as well as connate fluids.

To that end, a mud sampling tube 15 extends through opposite sidewall portions of the housing 10. The tube preferably is constructed with a section 15' of nonmagnetic and nonconductive material, such as a tetrafluoroethylene polymer sold under the name Teflon. The entire tube 15, 15' is constructed sufficiently strong to withstand the hydrostatic pressure of the bore hole and it is tilted with respect to a plane transverse to the vertical axis of the housing 10. In addition, it is sealed to the housing 10 so as to prevent the entry of mud into the housing proper, but the drilling mud may enter the tube itself. A pair of cup shaped mud scoops 16 and 17 are fixed to the exterior surface of the housing 10 at respective terminations of the tube 15 and are arranged so that as the housing 10 traverses the bore hole 11, a continuous flow of mud passes through the sampling tube 15.

Of course, any alternative means may be used to produce such a mud flow in the tube. For example, a motor driven pump may be suitably employed to assure the presence in the tube 15 of a mud sample representative of the mud column at the position of the housing 10 in the bore hole.

To prevent the stoppage of the mud flow in the tube 15, which may result from the engagement of either of its extremities with the sidewall of the bore hole 11, individual curved bumpers 18 and 19 are fixed to the housing 10 adjacent the terminations of the tube 15. Alternatively, means (not shown) for maintaining the housing 10 axially in the bore hole may be utilized to avoid such an occurrence.

The apparatus constructed in accordance with the present invention further includes an approximately C-shaped permanent magnet 20 whose oppositely spaced pole faces 21, 22 are suitably shaped so as to provide a substantially uniform field therebetween. The tube portion 15' is disposed between the pole faces 21, 22 and thus a first magnetic field is applied to the mud sample. The major component of this field is directed along a given axis, transverse to the pole faces 21, 22. Since the magnet 20 is of the permanent type, this field is of definable, fixed intensity. The magnet may be constructed of a material, such as an alloy of aluminum, nickel and copper, capable of providing the required field strength. For example, an intensity of 2,000 gauss has been found suitable; however, this value is merely illustrative, since greater or lesser values may be satisfactorily employed.

As pointed out hereinbefore, certain atomic nuclei process in the presence of a magnetic field and the precession frequency is different for nuclei of different elements. In response to the first magnetic field, nuclear precession occurs in elements of the sample in the tube 15 and to sustain such precession in the nuclei of a selected element, a second magnetic field having an intensity that varies at a definable, alternating frequency is introduced across the tube 15 with its major component transverse to the first field. This is accomplished by means of a pair of coils 23, 24 disposed on opposite sides of the sampling tube 15 with their convolutions aligned along an axis transverse to a line extending between central points of the pole faces 21, 22.

The coils 23, 24 are energized through leads 25 in aiding relation by a source 26 of radio frequency energy whose frequency is variable over a given range. The source 26, for example, may include a conventional self-excited electronic oscillator capable of supplying enough current to the coils to generate a magnetic field of a peak intensity of the order of 0.1 gauss in the pole gap wherein the tube section 15' is disposed. The oscillator may be provided with a reactance tube or variable condenser type frequency modulator. The operating frequency range of the source 26 may be determined in the following manner.

It has been found that the nuclear resonance frequency, $f$, in kilocycles per second (kc./s.) for the nuclei of a particular element may be expressed as follows:

$$f = 0.763 \mu i / H \tag{1}$$

where $\mu$ is the magnetic moment in nuclear magnetons and $i$ as a quantity describing the nuclear spin for the element. H is the intensity of the applied orienting magnetic field in gauss.

The quantities $\mu$ and $i$ for any of a variety of elements may be found in texts on nuclear physics or in circular 499 of the Bureau of Standards of the U.S. Department of Commerce, entitled "Nuclear Data." The published results of experimental work reveal that for elemental hydrogen, commonly referred to as a proton, $\mu = 2.79$ and $i = 1/2$. Substituting these values in Equation 1:

$$f = 4.258H \tag{2}$$

If, as suggested earlier, a field of 2,000 gauss is employed, it follows from Equation 2 that the nuclear resonance frequency for hydrogen occurs in the vicinity of 8,520 kc./s.

While this relationship holds for elemental hydrogen, it has been shown that a slight variation occurs due to the presence of other elements in compound with hydrogen. That is, hydrogen is found in the mud sample under observation in a compound with oxygen (water) and in a compound with carbon (the hydrocarbons being sought). The resonance frequency of hydrogen nuclei thus may be at frequencies slightly displaced from 8,520 kc./s. In order to accommodate such a frequency departure, i.e., to perform a searching operation, the frequency of the energy supplied by the source 26 is varied periodically over a range of frequencies, for example, of a few kilocycles.

Such a range of frequency variation may be provided by a saw-tooth generator 27 which may be connected to the control section (not shown) of the source 26 by leads 28a. Accordingly, in each operating cycle, the frequency of the signal applied to the coils 23, 24 is swept linearly from one end to the other of the required range and thereafter is quickly returned to the starting point. For reasons which will become more apparent as the following discussion proceeds, the generator 27 is preferably of the synchronized type, and synchronism occurs in response to an alternating potential supplied thereto over the conductors 28 in the cable 12, which are connected to a source of alternating current 29 at the earth's surface.

The source 29 is primarily employed to supply energy over the leads 28 and 28' to a power supply 30 within the housing 10. The power supply 30 may be of conventional construction for deriving from the applied alternating potential, a unidirectional potential at the leads 31 for energizing the various electronic stages contained in the housing.

During each frequency sweep of the energy supplied by the source 26, nuclear precession or resonance occurs. At each of the frequencies where this phenomenon occurs, power is absorbed from the source 26. Consequently, the radio frequency potental at the leads 25 decreases each time resonance occurs and this potential is effectively modulated downwardly in amplitude.

To detect such a variation or modulation, the potential at the leads 25 may be supplied through conductors 25' to conventional detector means 32. The modulation envelope signal in the output of the detector 32 may be amplified by a suitable amplifier 35, the output of which is fed to the leads 36 in the cable 12, which carry the signal to an amplifier 37 associated with an indicator 38 at the earth's surface.

The indicator 38 may comprise a conventional cathode ray tube 39 including the usual electrode system or electron gun 40 for projecting a beam of electrons towards a fluorescent viewing screen 41. The tube is also provided with a conventional deflection system such as horizontal and vertical plates 42, 43 for controlling the position of the point of impingement of the electron beam on the screen 41.

A synchronized saw-tooth generator 44 is connected through the leads 45 to the horizontal deflecting plates 42. The generator 44 may be synchronized by the potential of the source 29 applied through a phase control unit 46 which is adjusted so that the electron beam impinges at one extremity of the screen 41 at the same instant that the frequency sweep of the source 26 (in the housing 10) is initiated.

The output of the amplifier 37 is supplied over the leads 47 to the vertical deflection plates 43. Thus, as the beam sweeps horizontally across the screen 41, a component of vertical deflection is introduced each time nuclear resonance occurs at the sample in the tube 15.

The apparatus of FIG. 1 may also comprise means providing a permanent record of the occurrence of the nuclear resonance phenomenon. To this end a recorder 48 may be provided including a cathode ray tube 49 whose electron gun 50 projects a beam of electrons toward a fluorescent viewing screen 51. A set of horizontal deflection plates 52 are coupled to the output of the generator 44 and the output signal at the leads 36 is amplified in an amplifier 53 before being applied to the intensity control electrodes of the electron gun 50. Accordingly, a horizontal sweep trace is developed on the screen 51 in synchronism with the frequency sweep of the source 26. The intensity of the sweep trace is increased each time a nuclear resonance peak occurs.

Disposed in front of the trace on the viewing screen 51 is a photosensitive record strip 54 which is adapted to be advanced longitudinally past the screen 51 by a driven mechanism 55 at a rate directly proportional to the movement of the housing 10 through the bore hole 11. The usual light-tight housing (not shown) may be employed to prevent fogging of the strip 54 by extraneous light. Of course, conventional developing and fixing steps may be utilized in processing the record strip 54 after a logging run is completed.

Although cathode ray tubes 39 and 49 of the electrostatic deflection type have been illustrated, obviously electromagnetic deflection tubes may be employed. For example, deflection coils may be substituted for the deflection plates in a well-known manner.

In operation, the housing 10 is raised or lowered through the bore hole 11 at a selected speed and a sample of drilling mud flows continuously through the tube 15. In traversing the tube 15, the sample is exposed to the first and second magnetic fields generated by the permanent magnet 20 and the coils 23, 24, respectively. During the course of the frequency sweep of the source 26, nuclear resonance occurs in the sample and each such resonance modulates the amplitude of the radio-frequency signal at the leads 25. This modulation is derived by the detector 32 and, after amplification in the amplifier stages 35 and 37, is applied as a deflection signal to the vertical deflection plates 43 of the cathode ray tube 39. Accordingly, for each occurrence of the nuclear resonance phenomenon, a vertical deflection of the trace on the screen 41 of the tube 39 is effected.

Preferably, the lower end of the frequency sweep is represented by the left edge of the sweep trace on the screen 41. Since the sweep trace on the screen 41 progresses horizontally in synchronism with the frequency sweep of the source 26, horizontal distance along the sweep trace and measured from its left edge represents frequency. This "picture" is presented during each of the recurrent scanning intervals; thus a continuous visible display of the nuclear resonance phenomenon is produced on the screen 41.

Let it be assumed that at a particular depth in the bore hole 11, the drilling mud sample in the tube 15 contains hydrocarbons comprising the $CH_3$ and $CH_2$ complexes, for example, in addition to water. A broad nuclear resonance is observed on the screen 41 of the cathode ray tube 39 having a peak $a$ and an asymmetrical portion $b$ in FIG. 1A. The peak $a$ corresponds to the resonance of hydrogen nuclei in water. The asymmetrical portion $b$ represents resonances of hydrogen nuclei in compound with carbon (hydrocarbons), for example, as the $CH_3$ and $CH_2$ complexes. The relative amplitudes and spacings of peak $a$ and the asymmetrical portion $b$ are only represented schematically.

Since the proton-water content in the drilling mud may be assumed to be constant, there may be no substantial variation in the amplitude of the peak $a$. However, the hydrocarbon content may change as the housing 10 traverses the bore hole 11, and, accordingly, the asymmetrical portion $b$ will vary in amplitude during a logging run.

Concurrently with the production on the screen 41 of the trace described above and illustrated in FIG. 1A, a corresponding horizontal line trace is developed on the screen 51 of the tube 49. However, instead of exhibiting vertical fluctuations corresponding to the resonance phenomena, the latter are depicted by an increased intensity for the trace E. Thus, at points on the trace E (not shown) having the same horizontal positions as the peak $a$ and the asymmetrical portion $b$ on the trace shown in FIG. 1A, the intensity of the trace E increases. Of course, a variation in intensity occurs as the power absorption from the source 26 changes due to varying hydrocarbon content.

The line trace E is continuously recorded on photosensitive record strip 54 so that a continuous log showing intensity variations with depths is derived. Inasmuch as the amount of hydrocarbons at any depth along the column of drilling mud 14 after cessation of mud circulation in the bore hole 11 is dependent upon the hydrocarbon content of the adjacent formations, this log provides useful information about the material constituting the formations 13.

Therefore, novel nuclear resonance type well logging apparatus constructed in accordance with the present invention may be employed to analyze substances in relatively inaccessible places, such as earth formations traversed by a bore hole. Moreover, under suitable conditions, the apparatus is capable of distinguishing among various compounds of hydrogen and this is useful in determining the presence or absence of hydrocarbons in the earth formations.

If desired, nuclear resonance phenomena in a well may be detected by a bridge ararngement as illustrated in FIG. 2.

In the figure, a source 56 of radio frequency energy of fixed frequency is coupled to the coils 23, 24 through a coupling condenser 57. The coils 23, 24 are shunted by a variable condenser 58 and the detector 32 is coupled to the coils through a coupling condenser 59. The circuit is completed by a coupling condenser 60 extending from the junction of the source 56 and the condenser 57 to the junction of a resistor 61 and the variable condenser 62, connected in series and shunted across the input leads to the detector 32. This circuit may be recognized as the well-known form of "Twin-T" impedance bridge.

In order to detect the occurrence of nuclear resonance, the magnetic field is periodically varied. This is accomplished by a pair of coils 63 and 64 wound on the poles of the magnet 20 and energized in magnetic aiding relation by the saw-tooth sweep of the generator 27 which is available at the leads 28a.

The manner in which the circuit just described may be incorporated in the apparatus of FIG. 1 will be readily apparent, since it will be observed that only the portion of the apparatus below the detector 32 and the generator 27 of FIG. 2 differs from the corresponding portion represented in FIG. 1. Moreover, the frequency and field strength considerations follow the analysis presented in connection with the apparatus illustrated in FIG. 1; thus, the frequency for the source 56 and the field strength produced by the poles of the magnet 20 may be readily determined.

To adjust the circuit of FIG. 2 for operation, the generator 27 is disabled so that the resulting fields of the coils 23, 24 and the magnet 20 incident upon the sample within the tube 15 do not effect nuclear resonance. The condensers 58 and 62 then are adjusted to achieve minimum amplitude in the signal which appears at the leads 34; i.e., the bridge is balanced. Finally, the condenser 62 is detuned slightly and the generator 27 is energized.

By selecting a suitable amplitude for the saw-tooth sweep provided by the generator 27, nuclear resonance in a particular specie under investigation may be indicated as a curve desigated $x$ on the screen 41 (of the indicator 38) shown in FIG. 2A, and a corresponding indication may be derived by the recorder 48. Thus, an absorption log representing the abundance of a particular element is obtained.

Alternatively, the generator 27 may be arranged to sweep very slowly, e.g., at a rate of approximately 1 cycle per second, an additional sweep signal being impressed on the leads 28 by another sweep generator 27' shown in dash-line construction. The generator 44 is synchronized with the generator 27, the latter producing a magnetic field sweep of sufficient amplitude to traverse a range of field values similar to that employed in obtaining the representation $x$ of FIG. 2A. The generator 27', on the other hand, provides a sweep at a rate in the neighborhood of a few hundred cycles per second having an amplitude which is but a small fraction of the amplitude provided by the generator 27.

The alternative circuit is adjusted in essentially the same manner as described above, with the exception that the condenser 58 is detuned, rather than the condenser 62.

In operation, since the modulation amplitude produced by the generator 27' is less than a line width (the field intensity range between points of inflection on the curve $x$), an approximation of the derivative of curve $x$, as represented by the indication $y$ on the screen 41 of FIG. 2A is derived. The corresponding record produced by the recorder 48 may be termed a "dispersion-type" log. This type of representation features greater resolving power for resonance peaks closely spaced in frequency which might be otherwise coalesced in the absorption-type representation.

As the abundance of hydrocarbons rises a dispersion curve under a strong uniform polarizing magnetic field will show an asymmetry developing as illustrated schematically by a comparison with the regions indicated at $a$ and $b$ in FIG. 2B. The width between the peaks of the dispersion curve, indicated as $\Delta w$ in FIG. 2A, as well as the total excursion between the maximum and minimum amplitudes are functions of the abundance of a particular nuclear specie.

An alternative circuit arrangement is shown schematically in FIG. 3. The coils 23 and 24 are incorporated in the resonant circuit portion (not shown) of a conventional super-regenerative oscillator 65. A quench frequency oscillator 66 quenches the oscillator 65 in a known fashion and the operating frequency of the oscillator 65 is under the control of a sweep frequency oscillator 67.

The output of the super-regenerative oscillator 65 is supplied to a detector 68, coupled to an amplifier 69, which is coupled, in turn, to one input circuit of a phase sensitive detector 70. The other input circuit of the phase detector 70 is supplied with the sweep signal derived by the oscillator 67 and its output is applied to a recorder 71 which may be a conventional recording galvanometer, for example. It is obvious, of course, that the circuit arrangement of FIG. 3 may be incorporated in the bore hole apparatus of FIG. 1. In such case, the output of the phase detector 70 would be applied to the conductors 36.

In operation, by suitably adjusting the amplitude of the signal supplied by the oscillator 67, the frequency sweep of the oscillator 65 may be made greater than the range of frequencies occupied by a nuclear resonance peak, usually referred to as a line width. Accordingly, an absorption-type curve is obtained.

On the other hand, if the frequency sweep of the oscillator 65 is smaller than a line width, a dispersion-type curve is obtained at the recorder 71.

While a super-regenerative oscillator of the separately quenched type is shown in FIG. 3, a self-quenched device of well known construction may be utilized. Moreover, while a super-regenerative oscillator is preferred, in some installations a simple regenerative oscillator may be employed.

While the apparatus embodying the present invention has been illustrated in connection with the determination of hydrocarbon content of the bore hole liquid, obviously it may be employed to derive other useful data. For example, the locations where salt water flows into the bore hole 11 may be determined by exploring for sodium nuclei of atomic weight 23. From published tables of magnetic moments and nuclear spins, the quantities $\mu$ and $i$ are found to be 2.215 and 3/2, respectively. Substituting these values in Formula 1 above, it may be seen that a resonance frequency in the region of 2253 kc./s. is obtained for a magnetic field strength of 2000 gauss. Thus, by establishing a small frequency sweep about this value, as a center frequency in the apparatus of FIG. 1, a significant indication will appear on the viewing screen 41 each time nuclear resonance occurs for sodium nuclei. This indicates the intrusion of salt water into the bore hole 11.

Where the bore hole is provided with a casing, the apparatus may be employed to determine the level at which a casing leak has occurred, resulting in a flow of water into the bore hole. The amplitude of the indication derived on the screen 41 when the bore hole apparatus is at the level of such a leak provides an approximation of the abundance of the flow.

Other elements which may be sought in connection with the determination of the flow of salt water into the bore hole 11 are iodine or chlorine. Iodine may provide an indication characterizing water from hydrocarbon-bearing formations and thus may provide indirect information regarding conditions that are considered favorable for the presence of hydrocarbon content in the formations.

In searching for chlorine, for example, a frequency sweep from 650 to 850 kc./s. may be employed to obtain nuclear magnetic resonances for two different isotopes of chlorine. Specifically, the chlorine isotope of atomic weight 35 exhibits a nuclear resonance of 835 kc./s. at a magnetic field strength of 2000 gauss, while the isotope of atomic weight 37 exhibits a resonance of 693 kc./s. at the same field strength. Since the height of the peak derived on the viewing screen 41 is representative of the abundance of the particular element producing the nuclear resonance observed, the relative abundance of these two isotopes of chlorine may be investigated as an aid in studying variations in the geologic age of the strata.

Obviously, the apparatus shown in FIG. 1 may be employed to investigate bore holes that are filled with either a water base or an oil base drilling fluid. In the case of the latter, nuclear resonance phenomena may be sought in elements other than those protons that are combined with the hydrocarbons making up the oil base. For example, some of the alternative elements mentioned above may be sought.

If it is desired to explore simultaneously for elements exhibiting different nuclear resonance frequencies, the circuit modification of FIG. 4 may be utilized. It includes, in addition to the variable frequency source 26, a variable frequency source 72 also disposed within the housing 10. The source 72 may be synchronized in the same way as the source 26 (FIG. 1), i.e., by the saw-tooth wave which is supplied over the leads 28 from the generator 27. The output waves from the sources 26 and 72 are applied to individual input circuits of an electronic switch 73, the output of which is applied to the leads 25. The switch 73 may be of conventional construction providing alternate signal-translating paths between each of its input circuits and its output circuit in response to a control signal supplied thereto from a square wave generator 74.

In operation, the center frequencies of the frequency modulated waves from the sources 26 and 72 are individually adjusted approximately to the nuclear resonance frequencies of the different elements sought, respectively. In response to the square wave from the generator 74, these signals are supplied in alternation to the coils 23, 24. This switching action occurs at a rate considerably lower than the frequency sweep. Nuclear resonance is indicated by the amplitude modulation of the waves applied to the detector 32 which is preferably biased or otherwise designed so as to be substantially unresponsive to the amplitude modulation caused by the switching operation.

The foregoing type of alternate operation may be utilized to explore for nuclear resonance in the hydrogen and in the deuterium nucleus simultaneously. In this way, an indication may be obtained of their relative abundances. At a magnetic field strength of 2000 gauss, resonance for the deuterium nuclei occurs in the vicinity of 1310 kc./s., whereas, as pointed out earlier, resonance for the proton may be expected at 8520 kc./s. The center frequency of the radio frequency waves from the sources 26 and 72 are adjusted accordingly.

While a cathode ray type of recorder 48 has been illustrated in the logging system shown in FIG. 1, obviously, other types of recorders may be employed such as the one illustrated in FIG. 5, for example. In this figure, the output of the phase control means 46 is supplied over the leads 75 to a pulse generator 76 that provides a single pulse of relatively short duration for each cycle of the alternating potential from the source 29. The generator 76 is coupled to a delay multivibrator 77 of conventional construction, featuring an initiation control 78 represented by a dashed line, by means of which the time delay between the application of a pulse from the generator 76 and the generation of a pulse by the multivibrator 77 may be selectively adjusted. The multivibrator is also provided with a duration control represented by a dashed line 79, for selectively adjusting the duration of the pulse derived by the multivibrator.

Output pulses from the multivibrator 77 are applied to the control circuit of a conventional electronic switch 80, to the input circuit of which the output of the amplifier 53 is supplied through a conventional amplitude selector 81. The output circuit of the switch 80 is coupled to a mirror galvanometer 82 that reflects light energy in a beam 83 towards a light sensitive record strip 84. The strip 84 is continuously advanced by a drive mechanism 85 in synchronism with the movement of the housing 10 through the bore hole 11 (FIG. 1).

In operation of the modification of the apparatus shown in FIG. 5, the pulse amplitude selector 81 is adjusted so that only signals having an amplitude greater than a preselected minimum or datum level are supplied to the input circuit of the electronic switch 80. Thus, some of the extraneous noise may be effectively eliminated.

Each time a frequency sweep is initiated in the variable frequency source 26 (FIG. 1), a single pulse is generated by the pulse generator 76 (FIG. 5). By properly adjusting the initiation control 78, the operation of the multivibrator 77 is delayed by a time interval extending from the time of initiation of a frequency sweep to a point in time just prior to the peak $a$ or the portion $b$ in FIG. 1A. Moreover, the duration control 79 is adjusted so that the pulse produced by the multivibrator has a duration slightly greater than a selected one of these peaks. Thus, a time interval is generated which brackets one of the peaks shown in FIG. 1A, and the electronic switch 80, which is normally inoperative, is operatively conditioned only during the aforesaid time interval. Accordingly, only signals which occur in the selected time interval are translated by the electronic switch 80 to the galvanometer 82.

Since the galvanometer 82 responds to the amplitude of the applied signal, a trace is developed on the record strip 84 which is displaced from a reference line in accordance with the amplitude of the selected signal. As the record strip moves in synchronism with movement of the housing 10 through the bore hole, a continuous log representing the occurrence and abundance of a selected element is thus recorded.

In the embodiment of the invention illustrated in FIG. 6, an alternative means for determining the occurrence of nuclear resonance is employed. Although surface equipment has not been shown, it is to be understood that indicating and recording equipment similar to that shown in FIG. 1 may be utilized. Moreover, elements which have counterparts in FIG. 1 are represented by the same reference numerals.

A permanent magnet 86 of generally rectangular configuration is supported in the lower end of the housing 10. The magnet includes spaced, parallel pole faces 87 and 88 terminating the leg portions 89 and 90, respectively. The tube 15 is disposed in aligned openings 91, 92 that extend longitudinally through the legs 89, 90, respectively, thus permitting a continuous sample of drilling mud to flow in the direction of a first magnetic field which extends in a direction transversely of the pole faces 87, 88.

This first magnetic field is of definable, variable intensity as determined by the fixed field due to the inherent magnetism of the magnet 86 and the additional magnetic field generated by the current supplied to the coils 93, 94 that are wound on the legs 89, 90, respectively. This current is supplied to the coils by a sawtooth generator 95 over the leads 96. The generator is synchronized by the alternating potential at the leads 28 that extend through the cable 12 to a power source (such as the generator 29 of FIG. 1) at the earth's surface. As in the apparatus of FIG. 1, the alternating potential at the leads 28 is utilized to energize the power supply 30 which provides at the leads 31 a unidirectional potential for energizing the various electronic stages in the housing 10.

In order to sustain nuclear precession caused by the first magnetic field, a second, alternating magnetic field is developed by means of a pair of coils 97, 98 that are positioned on opposite sides of the tube 15 and that have a common axis of convolutions substantially perpendicular to a reference line extending between the pole faces 87, 88 within the tube 15. These coils are energized in aiding relation by a source of radio frequency power 99 over the leads 100. The source 99 provides a signal, preferably stable at a given radio frequency, and having a fixed maximum amplitude. For example, 8520 kc./s. may be employed if the proton is to be detected in a resultant magnetic field in the vicinity of 2000 gauss.

As the field across the pole faces 87, 88 varies due to the periodic current in the coils 93, 94, nuclear precession may occur at the operating frequency of the source 99. To detect such precession, a pair of pickup coils 101, 102 are disposed on opposite sides of the portion 15' of the tube 15 with their axes of convolutions in alignment with one another and in transverse relation with the plane defined by the aforesaid common axis and reference line. The coils 101, 102 are oriented for minimum pickup from the coils 97, 98 and are connected by the leads 103 to a radio frequency amplifier 104 tuned to the operating frequency of the source 99. In turn, the amplifier 104 is coupled in cascade relation with a detector 105 and an amplifier 106. The output of the amplifier 106 is supplied over the leads 36 of the cable 12 to an indicator and recorder, similar to the units 38 and 48 of FIG. 1. The stages 104, 105 and 106 may be comprised of conventional circuits of the type commonly found in radio frequency receivers such as tuned radio frequency, the superheterodyne, or super-regenerative receivers, for example.

In operation, as the housing 10 traverses the bore hole 11, a continuous flow of drilling mud 14 passes through the sample tube 15. Since the axes of the coils 97, 98 and 101, 102 are oriented transversely with respect to one another, little voltage is induced in the pickup coils 101, 102 in the absence of nuclear precession.

However, as the intensity of the first magnetic field varies due to the periodic wave applied to the coils 93, 94, nuclear resonance may occur and may be maintained at the operating frequency of the source 99. The precessing nuclei induce a voltage in the pickup coils 101, 102 which supply a radio frequency signal to the receiver comprising the elements 104, 105 and 106, the output signal from which is fed over the leads 36 to the surface equipment.

The magnetic field at which precession occurs for a particular nucleus varies slightly with the environment or compound in which it is found. Hence, as the field sweep varies in amplitude and the indicator sweep progresses across the indicator screen (of the tube 39 in FIG. 1, for example), the trace is deflected vertically each time nuclear resonance occurs. A display like that shown on the screen 41 (FIG. 1A) is thus developed.

The recorder 48 responds in exactly the same manner as explained in connection with FIG. 1, and a continuous log of the hydrocarbon content of the formations 13 is obtained.

Where it is desired to examine samples of fluid in the surrounding earth formations, the mud-sampling apparatus of FIG. 1 or of FIG. 6 may be provided with a sidewall engaging shoe or packer (not shown) together with driving mechanism (not shown) controllable from the surface for urging the packer into engagement with the wall of the bore hole. Thus, the packer may be selectively driven into engagement with the sidewall of the bore hole at a selected depth and a fluid sample conveyed to the tube 15 from an entry port in the outer wall of the packer communicating with the tube 15 through a flexible tube.

The embodiment of the invention shown in FIG. 7 illustrates the utilization of nuclear resonance techniques to provide a log of earth formations 13 in situ. It comprises a bowed spring 107 secured at its ends to upper and lower slidable connections supported by the housing 10. An elongated pad 108 is attached to a central section of the spring 107 in vertical alignment with the bore hole. A bowed, back-up spring 109 arranged similarly, but positioned oppositely to the spring 107 cooperates with the latter in maintaining the pad 108 in engagement with the sidewall of the bore hole 11.

The pad 108 preferably is constructed of a nonmagnetic material, such as aluminum or Teflon and an elongated permanent magnet 110, made from a cylinder of ferromagnetic material with an opening parallel to its axis is affixed to its rear portion. As best shown in FIG. 8, the magnet may be C-shaped in cross section. Its pole faces 111, 112 are embedded in the pad 108 and terminate at planes which intersect one another at an acute angle of about 45°. Generally stated, the configuration of the magnet and its pole faces is such that a first magnetic field of fixed intensity extends into the formations 13 for a desired distance relatively to the axis of the bore hole. The intensity and uniformity of the field is made sufficient to produce Larmor nuclear precession in constituent material of the formations, in situ. This field has a rather uniform flux over a small volume of the earth formations of longitudinal extent parallel to the axis of the bore hole.

Using a cylindrical magnet of the type illustrated, exhibiting a field strength of a few thousand gauss, a useful field of the order of magnitude of 100 gauss may be derived a few inches within the formations. The degree of uniformity of this field and the extent of its penetration into the formations may be altered as desired over a limited range by the use of appropriately positioned oblong coils (not shown), which may be of a length approximately that of the permanent magnet pole pieces. These auxiliary coils may be suitably energized by a source of current that is regulated to maintain a fixed magnetic field intensity in the formations. In order to accommodate adjustments in the field, these coils may be wound on magnetic cores and arranged to have a polarity opposite to the polarity of the corresponding pole piece of the magnet 110.

To set up a second magnetic field of varying intensity transversely of the first field, a coil 113 is embedded in the pad 108. The coil 113 is of oblong or long-rectangular configuration with its sides closely and equally spaced from the sidewall of the bore hole. It is connected by means of a pair of leads 114 to a source (not shown) of radio frequency current within the housing 10. This source may be identical to the one designated 26 in FIG. 1. The frequency at which intensity alternation occurs in the second field is of definable or periodically varying value, since the source 26 is periodically swept in frequency. The intensity of the radio frequency magnetic field may be adjusted to a selected maximum value within a range from a few tenths to a few hundredths of a gauss over a small volume of the formation depending upon the nuclei to be detected. Moreover, the housing 10 may also include stages which correspond to the saw-tooth generator 27, the power supply 30, and detector amplifier 32, 35 of FIG. 1, connected in a similar system.

The operation of the apparatus of FIG. 7 follows that presented in connection with the apparatus of FIG. 1, except that the earth formations are examined in situ, rather than the constituent elements of the formations found in the drilling mud.

It is to be noted that the nuclear resonance frequency to be anticipated in the use of the apparatus of FIG. 7 is not the same as suggested in connection with the arrangement of FIG. 1 because of the difference in the magnetic field strength used. For example, if a field strength of 100 gauss is attained, from Equation 2 above, it is evident that the center frequency to be used in searching for the proton in its various compounds should be in the neighborhood of 426 kc./s. Inasmuch as the magnetic field strength to which the formations under examination are exposed is lower than that employed in the mud-sampling arrangement of FIG. 1, the signal to noise level in the detection and indicating system will be less. Accordingly, the amplitude and time-selective arrangement of FIG. 5 may be employed to minimize the effects of extraneous noise.

In the modification of FIG. 9, the spring 107 is provided with a straight, central section to the center of which a bar magnet 115 is affixed. The magnet 115 is of rectangular cross section and has a flat pole face 116 embedded in the rear end of a pad 117 of nonmagnetic material such as aluminum or Teflon. The pad 117 is maintained in engagement with the sidewall of the bore hole 11 and a helical coil 118 is embedded therein with the axis of its convolutions parallel to the surface of the pole face 116. The coil 118 is connected by leads 114 to a source (not shown) of radio frequency power in a housing in the same manner described in connection with the apparatus of FIG. 7.

Thus, a first field of fixed intensity is applied to the formations under investigation together with a second field transverse to the first. The second field, of course, has an intensity which varies at an alternating rate so as to maintain nuclear precession in the sample.

Figure 10:
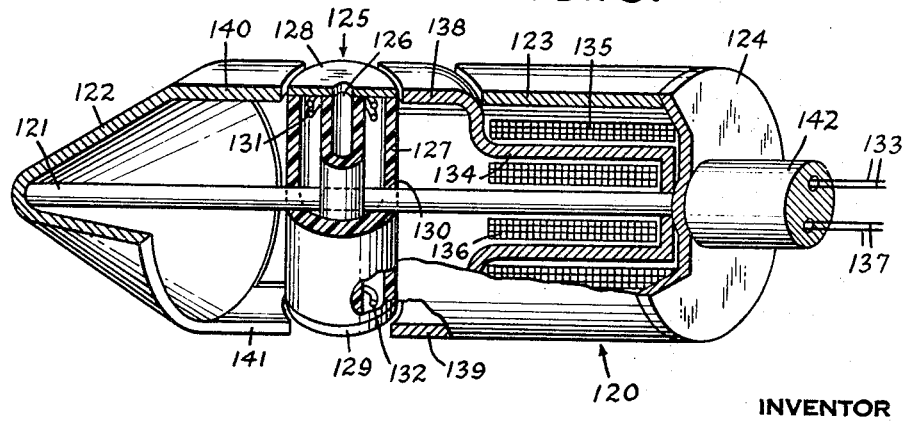
FIG. 10 is a perspective view of a further embodiment of the invention.

In FIG. 10 there is shown a bullet-type formation fluid sampler for examining earth formations in situ. It may for example, be associated with the apparatus of FIG. 1, those components within the housing 10, located below the physical locations of the elements 26 and 32 not being used. Instead, a conventional detonation chamber and explosive charge arrangement (not shown) is secured to the housing. For example, a detonation chamber and explosive charge of the type disclosed in Pat. No. 2,055,506 of Marcel Schlumberger, may be employed to house the bullet 120 of FIG. 10 and to fire it selectively into the sidewall of the bore hole at a point opposite a formation of interest.

The bullet 120 may comprise a support rod 121 of nonmagnetic material, such as brass, to the forward end of which a core-shaped nose-piece 122 is secured. The nose piece 122 is preferably constructed of a magnetic material strong enough to resist the forces which result when the bullet 120 is fired into a formation.

A hollow, cylindrical housing 123 extends in coaxial relationship with the rod 121 and is secured to the rod by a disc-shaped end closure 124. The housing 123 is spaced from the nose-piece 122 to define a space wherein a coil assembly 125 is supported in transverse relation to the rod 121. The coil assembly 125 includes inner and outer coaxial cylinders 126 and 127 made of insulating material and end closures 128 and 129. The rod 121 passes through suitable openings in the walls of the cylinders 126 and 127, such as the opening 130, for example. The inner diameter of the inner cylinder or tube 126 is larger than the diameter of the rod 121 so that the bore hole fluid may flow therethrough.

Supported between the walls of the coaxial cylinders 126 and 127 are upper and lower coils 131 and 132. These coils are connected in series circuit relation and are connected by leads 133 to leads 25 (FIG. 1).

A U-shaped core 134 of magnetic material is supported so as to lie in the plane of the axes of the rod 121 and assembly 125. Each of the legs of the core 134 supports one of a pair of coils 135 and 136 which are connected in series circuit relation and by leads 137 to a source of unidirectional current, such as the power supply 30 of FIG. 1.

The end poles 138 and 139 of the core 134 are deformed so as to coextend with the housing 123 and to provide magnetic fields in the vicinities of the coils 131 and 132 of the assembly 125. To close the magnetic circuit, the nose-piece 122 is provided with pole pieces 140 and 141.

Preferably, the openings in the bullet 120, with the exception of the tube 126, are filled with a nonmagnetic material, such as Teflon so that a smooth exterior surface is effected.

To permit the withdrawal of the bullet 120 after a sampling operation, a flexible cable 142 extends between the disc 124 and the housing 10 (FIG. 1). The cable 142, which preferably houses the leads 133 and 137, is arranged in the usual manner prior to a sampling run so as not to impede movement of the bullet at the time it is fired.

In operation, the entire apparatus is lowered to the depth of a formation of interest and the bullet 120 is driven into the formation by means of the detonation chamber and explosive charge (not shown). Fluids in the formation flow into the bore of the tube 126 and are exposed to the fixed magnetic field generated by the coils 135, 136 in association with the core 134, and the pole pieces 138, 139, 140 and 141, in the vicinity of each of the coils 131 and 132. The magnetic fields produced by the coils 131 and 132 are oriented transversely of the fixed fields and nuclear resonances in the fluid within the tube 126 are indicated in the same manner as explained in connection with FIG. 1.

After a suitable record or log is made, the housing 10 (FIG. 1) is raised and the bullet 120 is drawn from the formation since it is attached to the housing by the wire line 142.

FIG. 11 illustrates typical apparatus according to the invention for obtaining indications of so-called "spin echoes" in well logging by nuclear magnetic resonance. In this embodiment, the magnet 20 supplies the fixed polarizing field to a sample in the tube 15, as in FIG. 1. For accurate and reproducible data, the magnetic field should be held constant to about one part in $10^5$ over the length of time that a measurement is being made and known types of devices employing nuclear magnetic resonances phenomena may be employed for this purpose. The coils 23 and 24 which provide the RF field are tuned to the average Larmor precession frequency for the nuclear moments in the sample by an adjustable condenser 142. The resonant circuit comprising the condenser 142 and the coils 23 and 24 is adapted to be pulsed by a succession of at least two short RF pulses. These pulses may be provided by an RF oscillator 143 oscillating at the Larmor frequency for nuclear specie under examination in the uniform polarizing fixed magnetic field, the amplified RF output from which is supplied through suitable gate and timer means 144 and a condenser 145 to the resonant circuit. The gate and timer means 144 is synchronized by a sweep generator 146 which also supplies a sweep voltage to the horizontal deflection plates of a conventional cathode ray tube 148. For convenience, the oscillator 143 and gate and timer means 144 may be designed to afford pulse widths in the range 20μ sec. to a few milliseconds and RF fields at the coils 23 and 24 in the range 0.01 to 50 gauss.

The resonant circuit is also connected through a condenser 149 to a preamplifier and receiver 150 which supplies an output to the vertical deflection plates 151 of the cathode ray tube 148.

For simplicity, only echo effects produced by subjecting the sample to two RF pulses in succession will be considered, although more than two pulses may be used. For the spin echo effect, it is essential that the pulse width $t_w < \tau < T_1$ and $T_2$, where $\tau$ is the time interval between pulses, $T_1$ is the longitudinal or thermal relaxation time (the time in which a precessing spin remains in the magnetically excited state regardless of its phase), and $T_2$ is the transverse relaxation time (the time for which constituent nuclear spins precess in phase before damping effects due to the spin lattice become appreciable, determined in part by $T_1$).

In the following explanation, which follows that advanced by E. L. Hahn in his article "Free Nuclear Induction" (Physics Today, vol. 6, No. 11, November 1953, pages 4–9), let it be assumed that the magnet 20 generates a fixed polarizing field $H_0$ which passes through the sample in the tube 15 of FIG. 11. A short time after the sweep signal from the sweep generator 146 begins its traverse, the gate and timer means 144 functions to permit a short RF pulse of Larmor resonance frequency $f$ and of pulse width $t_w$ to pass from the oscillator 143 to the resonant circuit comprising the condenser 142 and the coils 23 and 24. This pulse is also applied through the condenser 149 and the preamplifier and receiver 150 to the vertical deflection plates 151 of the cathode ray tube 148 on which it is represented by the trace 152. Assume that the field $H_1$ established by the coils 23 and 24 upon energization by the RF pulse has a rise and fall time that is very short as compared with its width $t_w$ in seconds.

During the time $t_w$, those magnetic moments initially aligned along the fixed field $H_0$ will be turned towards a plane perpendicular to the $H_0$ vector and containing $H_1$. $H_1$ is made sufficiently intense to insure that this will occur in a time that is short as compared to the time in which most of those magnetic moments would get out of phase with $H_1$. Therefore, all the moments are substantially in phase at the time $t_w$ when they have reached the plane containing $H_1$ and normal to $H_0$. At this time, the field $H_1$ is suddenly removed. A nuclear induction signal in the coils 23 and 24 will persist after the field $H_1$ is removed (see trace 153 in FIG. 11), but will finally die out because each moment is now free to precess at its natural frequency. Since these frequencies will differ slightly, the moments will after a time get out of phase and their inductive effects will interfere or cancel among themselves. The original in-phase magnet moment vectors will then be uniformly distributed about an axis extending in the same direction as $H_0$ but the original magnitudes of these moments are preserved if it is assumed that there are no relaxation effects. Although these moment vectors do not provide a resultant moment, they do have definite phase relations among themselves.

For simplicity in understanding spin echo phenomena, the second pulse is made either of the same intensity and twice as long as the first pulse or twice as intense with the same duration as the first pulse. From the time $H_1$ appears again, each magnetic moment vector precesses in a cone whose axis is the direction of $H_1$. At the instant the second pulse is removed, all vectors will have been rotated from whatever quadrants in the plane normal to $H_0$ they happened to have been in (at the onset of the second pulse) on one side of $H_1$ to a mirror image position on the opposite side of $H_1$. Thus, the array of isotropically distributed moments has been rotated 180° about an axis in the direction of $H_0$.

Considering the central average direction of the magnetic moments, each moment which lay ahead of this average moment by a given angle before the second pulse now lies behind it by the same angle. Further, each moment which lay behind the average direction by a given angle will lie ahead by the same angle. Now if these magnetic moments continue to precess as before, those behind the reference vector or average direction will be catching up and those ahead will be falling back. Hence, at time $\tau$ behind the second pulse 154 (FIG. 11), all the moment vectors will be back in phase and an echo 155 (FIG. 11) will occur at time $2\tau$.

The selection of pulses such that the first pulse of width $$\frac{1}{4_\mathrm{f}}$$

rotates all of the vectors by 90°, while the second pulse of twice that width rotates them by 180° gives the maximum available echo. However, useful results may also be obtained with other arbitrary combinations of $t_w$ and $H_1$ giving different angles of rotation. For example, the second pulse may be of equal length and equal intensity as the first pulse, in which case the array is rotated 90° rather than 180°, as described above.

From the trace produced on the cathode ray tube, it is possible to determine the relaxation times $T_1$ and $T_2$ as explained in an article entitled "Spin Echoes," by E. L. Hahn, in the Nov. 15, 1950 issue of "Physical Review." From these data, it is possible to identify the substance comprising the sample in the tube 15. The publication also indicates how echo beats and envelope modulation effects appearing on the trace on the cathode ray tube 148 afford information about shifts in the exact magnetic resonance frequency of nuclear moments of a given species depending upon the type of molecule in which it is obtained. From such data, different molecules containing like atoms can readily be distinguished. Likewise, the different relaxation times for molecules under changing physical environment may be determined, for those molecules which contain nuclei with magnetic moments.

If desired, conventional photographic recording means may be provided for making a permanent record of the trace on the cathode ray tube 148.

Although in the several embodiments of the invention just described, a saw-tooth type of sweep has been employed, obviously other waveforms may be utilized. For example, a sweep signal of sinusoidal form may vary the output frequency of the radio-frequency source or a square wave may vary the field intensity of the magnet, as the case may be, and a corresponding periodic sweep may be employed in the indicator and recording units.

Of course, the spin-echo technique could be practiced with the apparatus shown in FIG. 6 by pulsing the stable RF source 99, if desired.

The spin echo technique is well adapted for studying a partciular earth formation in situ where the change in relaxation time can be determined quite accurately by changing the elapsed time between pulses at a given level and observing the decay of the envelope of the resultant pulses and the elapsed time. It thus affords an effective tool for the detailed examination of material at a particular depth in a bore hole.

The embodiment of the invention shown in FIG. 7, or its modification shown in FIG. 9, may be utilized in deriving a log of the aluminum content of the earth formations traversed by the bore hole 11 in connection with the determination of the occurrence of shale. Published tabulations of experimental results reveal that for aluminum, quantities $\mu$ and $i$ of Equation 1 presented hereinbefore are 3.639 and 5/2, respectively. For a field strength of 100 gauss, the expected frequency of nuclear resonance is in the neighborhood of 111 kc./s. Accordingly, a frequency sweep of about 250 c.p.s. centered on the expected resonance frequency may be employed.

Nuclear magnetic resonance apparatus according to the invention may also be employed to explore for carbon of atomic weight 13 around 107 kc./s. for a magnetic field of 100 gauss. In this way, hydrocarbons may be identified, particularly in lime-free reservoirs.

It will be understood that other forms of bridges may be used in place of the bridge shown in FIG. 2 such as, for example, a mutual impedance bridge of the type disclosed in the copending application Ser. No. 750,307, filed May 24, 1947, by Henri-Georges Doll, for "Phase Rejection Networks" now Pat. No. 2,788,483. For example, the output from the coils 23, 24 might be fed to a phase selective network of the type disclosed in this Doll application, either the reactive or the resistive component being balanced out continuously and the other component being measured.

Another field of interest in which nuclear magnetic resonance apparatus of the type described above may be used is in the detection of trace elements which are known to be associated with petroleum in relative abundance. Among such trace elements are iodine, vanadium and nitrogen. Thus, for the detection of $V^{51}$ ($i=7/2$ and $\mu=5.14$) a Larmor precession frequency of about 111 kc./s. might be used with an applied magnetic field of 100 gauss. Similarly, the most abundant nitrogen nucleus $N^{14}$ would be expected to appear at a resonance frequency of about 615 kc./s. for a magnetic field of 2000 gauss. A determination of the presence of nitrogen would be of interest in any program concerned with the origin of petroleum.

The ratio of sodium to potassium, which is of great interest in analyzing different petroleum reservoirs is another quantity that may be investigated in accordance with the invention. The position of the most abundant sodium nucleus has already been given for a magnetic field intensity of 2000 gauss, namely, approximately 2250 kc./sec. The most abundant nucleus of potassium, namely $K^{39}$, would appear at a resonance frequency of 396 kc./sec. for the same magnetic field strength.

The apparatus of the invention also has utility in searching for minerals either at the earth's surface or in bore holes drilled into the earth. Metals in the metallic state show a resonance line that is a few kilocycles per second higher in frequency than the line for the metallic nucleus when it occurs in a salt for the same magnetic field sterngth. This shift in frequency between metals and their salts is called the "Knight shift." Thus, for example, the resonance for the most abundant copper nucleus $Cu^{63}$ in the form of a copper salt would occur at a frequency of about 2260 kc./sec. in a magnetic field of 2000 gauss, whereas, for the metal itself the resonance would occur at a frequency about 5 kc./sec. higher for the same magnetic field. In this way, metallic copper could be distinguished from copper salts. The nuclei of lead, $Pb^{207}$, and zinc in the form $Zn^{67}$ could be located according to the invention where their ores come within the influence of the nuclear resonance exploration apparatus.

Observations of the asymmetry developing in the resonance line for the portion will give a lead as to the type of hydrocarbon present. For example, an aliphatic base hydrocarbon will produce an asymmetry principally on one side of the proton resonance peak. On the other hand, an asphaltic base hydrocarbon having protons in the carbon ring will develop an asymmetry on the other side of the proton resonance peak. Hence, by noting on which side of the peak an asymmetry occurs, it is possible to predict whether asphaltic base or aliphatic base hydrocarbons are present.

It should be noted that bound water in the clays and other compounds in the mud will result in a broad base for the proton resonance curve. This base will vary, though, in a more or less symmetrical fashion.

The sensitivity of detection can be increased by subjecting the sample being tested simultaneously to a radio frequency magnetic field at the resonance frequency of nuclei other than those sought that are present in abundance. This will orient the populous nuclei and increase the intensity of the resonance signal from the nuclei being sought. This might be accomplished in the apparatus shown in FIG. 4 by adjusting the variable frequency source 72 to the proton resonance frequency, for example. The amplitude of oscillation is increased so that alternating fields of a few tens of gauss are applied to the formation through the electronic switch 73 in bursts of energy of duration shorter than the relaxation times $T_1$ and $T_2$ for the protons. The variable frequency oscillator 26 is adjusted to optimum field strength for the nuclear specie being sought. If desired, a steady state measurement can be made by by-passing the RF oscillator through the electronic switch 73 to a separate coil system (not shown) located, for example, coaxially with the coils 23, 24.

Alternatively, the embodiment of FIG. 6 could be used to provide a strong RF field from the source 99 for the protons, the amplifier 104 and detector 105 being tuned to the induction frequency expected for the nuclear specie being sought in the polarizing magnetic field used.

By means such as described above, the nuclear specie under examination is affected by the macro-scopic moments imparted to the volume under observation by the increased alignment of the protons. As a result, a corresponding increased coherence in the resonance response of the nuclear specie under examination will be produced.

The nuclear magnetic resonance apparatus described above is also useful in the examination of the effects of quadrupole resonance phenomena in nuclei whose spin is greater than one-half. In that way, for example, identification of changes in crystal structure in the formations could be determined in favorable cases and correlation between wells could be made. Of course, pulse echo techniques could be utilized to determine relaxation times resulting from resonance phenomena.

Furthermore, apparatus such as that shown in FIG. 3 may be used to detect effects produced when material in a bore hole is irradiated by an RF field of definite frequency. In particular, the coils 23 and 24 could be placed in a pad adapted to be applied to the wall of the bore hole, with or without means providing a polarizing magnetic field, to measure observable phenomena resulting from pure quadrupole spectra. The frequencies here though would usually be greater than a few megacycles.

It would also be particularly useful in correlating formations to determine the piezoelectric absorption effects along the bore hole with the apparatus described above. It has been found that a dense spectrum of piezoelectric absorption does occur in earth material when subjected to an RF field at a frequency between 20 and 40 megacycles per second with no magnetic polarizing field being applied. This effect is noted particularly in the examination of well cuttings.

Instead of subjecting the sample to be tested to an RF magnetic field, similar results may be secured by using mechanical wave energy of the same frequency. In such case, conventional compressional wave generating means designed to generate compressional wave energy of the proper frequency will be used. This vibrational energy will induce movement of material containing nuclei with magnetic moments. Under the motion of this material in a polarizing magnetic field, an electromotive force will be induced in the coils 23, 24 of the embodiment shown in FIG. 3, for example, which will result in signals of increased amplitude as the super-regenerative oscillator is tuned to the resonance frequency.

The embodiment shown in FIG. 4 can also be employed to detect metals and metallic ores in an improved manner by irradiating the material under examination with a radio frequency magnetic field that will produce a Larmor precession for the spin of an electron in the polarizing magnetic field applied to the material. This RF field is pulsed with a period shorter than the spin relaxation time of the electron in the material. The alternating field may be a few tens of gauss, approaching saturation of the orientation of the electron spin. Simultaneously, a substantially steady state measurement will be made for the purpose of detecting nuclear magnetic resonance for the particular nuclear specie being sought.

In a polarizing magnetic field of 100 gauss, the RF frequency for the electron spin resonance would be around 280 megacycles per second. The resonance frequencies for metals would depend upon the particular nuclear isotopes being sought. For copper ores, for example, $Cu^{63}$ would be searched for in the region around 113 kilocycles per second, while $Cu^{65}$ would require a frequency of about 121 kilocycles per second at a field of 100 gauss. At this low field, the lines would be broad.

Inasmuch as lowering the magnetic field strength causes a decrease in the nuclear resonance signal, methods which aid in improving detection are helpful. The apparatus of FIG. 4 could be used to improve the signal from magnetic nuclei by pulsing the formation with a strong RF field at the electron spin resonance frequency. At ten gauss, for example, this frequency would be about 28 mc./sec. and the nuclear resonance frequency for protons would be about 42.6 kc./sec.

Since the elevated temperature in the bore hole tends to decrease the intensity of the signal from nuclear resonance phenomena, the thermal relaxation time $T_1$ may be decreased by adding paramagnetic ions to those drilling muds which are deficient in such ions so as to increase the number of nuclei available to participate in the resonance phenomenon. Usually, however, paramagnetic substances such as occur in iron compounds are present in the drilling mud and will tend to compensate for this influence on the observed signal.

In the various embodiments of the present invention just described, monitoring of any variations in the effective applied magnetic field may be accomplished where desired. For example, if a nonmagnetic material composed of Teflon, as suggested above, is employed to support the various portions of the magnet system, the resonance for the fluorine nuclei in the Teflon may be used to control the magnetic field by means of auxiliary coils (not shown) placed about the magnet. In that way, the field may be maintained at a substantially constant value through controlling an auxiliary magnetic field produced by electromagnetic means.

For example, in the apparatus illustrated in FIG. 1, if the tube 15 is comprised of Teflon and if it is desired to utilize additional coils together with the magnet 20 for producing the fixed magnetic field, a switching system similar to the one illustrated in FIG. 4 may be adapted to provide one frequency sweep for the elements under investigation, and another frequency sweep over a range of frequencies that include the nuclear resonance frequency for fluorine. Thus, using the values of $\mu$ and $i$ of 2.6248 and 1/2, respectively, and a magnetic field strength of 2000 gauss, the expected nuclear resonance peak for fluorine of atomic weight 19 occurs in the neighborhood of 8012 kg./s., as may be determined from Equation 1. Suitable gating means may be employed so that an output signal is derived from the detector amplifier 32, 35 during the intervals of the sweep in frequency in which fluorine nuclear resonance occurs. That signal may be employed in connection with an automatic field strength control for the magnet system.

If desired, suitable arrangements for automatic frequency control may be incorporated in the housing 10 for the radio frequency oscillator circuit as well as automatic means for maintaining a constant maximum amplitude in the output from the oscillator as applied to the coil.

The amplitude of the detected signal as obtained from nuclear moments could be automatically compared to a reference signal of known amplitude. Then, by the movements of a servo mechanism, for example, acting to maintain balance across a comparison bridge circuit, the indications of relative variations for a nuclear specie could be recorded.

It should be noted that the amplitude of the proton peak of water, where the apparatus is used to observe the proton nuclear resonance in situ, will give an indication of variations in the porosity of the formations along the wall of the bore hole.

Nuclear magnetic resonance well logging apparatus of the type disclosed may be accompanied by other electrical logging equipment as it traverses a bore hole. For example, in the embodiment of FIG. 7, the spring 109 may be provided with a pad arranged to be pressed against the sidewall of the bore hole and provided with a suitable array of electrodes. This array may be utilized in a manner known to the logging art for performing any of various electrical resistivity measurements in a well. Moreover, an electrode may be provided either on the supporting cable or immediately above the housing 10, or in a pad mounted on the spring 109 for measuring the spontaneous potentials existing along the bore hole so as to correlate the record of the nuclear magnetic resonance log precisely with an electrical log.

I claim:

1. In a method for investigating a well drilled into the earth, the steps of subjecting nuclei having magnetic properties and comprising material at a selected level in a well to a first unidirectional magnetic field, simultaneously subjecting said nuclei to an alternating magnetic field directed at an angle to said first field, sweeping the amplitude of said first field at a first relatively low frequency through a range including at least one value for which Larmor precession of selected nuclei will be sustained, superimposing on said first sweep a second amplitude sweep of relatively small amplitude and relatively high frequency, providing a signal representative of Larmor precession of nuclei, and obtaining indications of said signal.

2. In apparatus for investigating a bore hole drilled into the earth, the combination of first magnet means mounted for movement through the bore hole and disposed so as to subject nuclei having magnetic properties and comprising material in the well to a substantially constant magnetic field, second magnet means mounted in fixed relation to said first magnet means for subjecting said nuclei to an alternating magnetic field directed at an angle to said constant magnetic field, first means for sweeping the frequency of said alternating magnetic field through a first range including the Larmor precession frequency for selected nuclei, second means for sweeping the frequency of said alternating magnetic field through a second range including a second Larmor precession frequency for other selected nuclei, means providing alternately recurring signals representative of Larmor precession of said selected and other selected nuclei, respectively, and means providing indications of said signals.

3. In apparatus for investigating a bore hole drilled into the earth, the combination of first magnet means mounted for movement through the bore hole and disposed so as to subject nuclei having magnetic properties and comprising material in the well to a unidirectional magnetic field, coil means mounted in one arm of an impedance bridge and disposed so as to subject said nuclei to an alternating magnetic field directed at an angle to said unidirectional field, a source of constant frequency alternating current connected to energize said bridge, means for periodically sweeping the amplitude of said unidirectional field at a relatively low frequency through a range including at least one value for which Larmor precession of said nuclei will occur, means for superimposing on the sweep generated by said first sweeping means a second sweep of relatively small amplitude and relatively high frequency, means for providing a signal representative of Larmor precession of the nuclei, and means providing indications of said signal.

4. Bore hole investigating apparatus as defined in claim 3 in which the relation between the sweep frequency of the amplitude of the unidirectional field and the second sweep frequency superimposed thereon is such that one cycle of the latter is completed in a very small fraction of a cycle of the unidirectional field sweep frequency and the amplitude of the second sweep is less than that represented by the spacing between the points of inflection of the resonance peak obtained from a plot of energy absorption vs. magnetic field strength, the frequency of said alternating magnetic field being held constant, whereby dispersion-type indications may be obtained.

5. In apparatus for investigating a bore hole drilled into the earth, the combination of first magnet means mounted for movement through the bore hole and disposed so as to subject nuclei having magnetic properties and comprising material in the well to a substantially constant magnetic field, coil means mounted in fixed relation to said magnet means for subjecting said nuclei to an alternating magnetic field directed at an angle to said constant magnetic field, super-regenerative oscillator means having resonant circuit means including said coil means, sweep frequency control means for sweeping the frequency of said oscillator means over a range, quench frequency oscillator means for quenching said super-regenerative oscillator means, the frequency of said quench oscillator means being lower than that of said super-regenerative oscillator means, electrical indicating means, and phase sensitive detector means responsive to the output of said super-regenerative means and the output of said sweep frequency control means to provide an output signal to said indicating means.

6. Bore hole investigating apparatus as defined in claim 5 in which the frequency sweep of the super-regenerative oscillator means is greater than that represented by the frequency spacing between the points of inflection of the nuclear resonance peak obtained from a plot of energy absorption vs. frequency, whereby absorption-type indications may be obtained.

7. Bore hole investigating apparatus as defined in claim 5 in which the frequency sweep of the super-regenerative oscillator means is smaller than that represented by the frequency spacing between the points of inflection of the nuclear resonance peak obtained from a plot of energy absorption vs. frequency, whereby dispersion-type indications may be obtained.

8. In apparatus for investigating a bore hole drilled into the earth, the combination of first magnet means mounted for movement through the bore hole and disposed so as to subject nuclei having magnetic properties and comprising material in the well to a substantially constant magnetic field, coil means mounted in fixed relation to said magnet means for subjecting said nuclei to an alternating magnetic field directed at an angle to said constant magnetic field, means for exciting said coil means with oscillations sweeping periodically in frequency through a range including a value for which Larmor precession occurs in selected nuclei, means for exciting said coil means with oscillations sweeping periodically in frequency through another range including a value for which Larmor precession occurs in other nuclei, means providing alternately recurring signals representative of Larmor precession of said selected and other nuclei, respectively, and means providing indications of said signals.

9. In apparatus for investigating a bore hole drilled into the earth and containing a column of liquid, the combination of an enclosure adapted to be lowered into a well, conduit means carried by said enclosure communicating at both ends with the bore hole liquid, means for circulating bore hole liquid through said conduit means, magnet means in said enclosure and disposed so as to subject nuclei having magnetic properties in the fluid in said conduit means to a unidirectional magnetic field, means mounted in fixed relation to said magnet means for subjecting said nuclei to wave energy at an angle to said unidirectional field, and means providing indications of nuclear magnetic resonance in said nuclei.

10. Apparatus for investigating a well drilled into the earth, comprising a support adapted to be lowered into a well, a projectile carried by said support, means on the support for forcing said projectile into the wall of the well, said projectile having conduit means therein accessible to fluid in the material comprising the wall of the well, magnet means for subjecting substances in said conduit means to a substantially constant magnetic field, coil means for subjecting said substances to an alternating magnetic field directed at an angle to said constant field and oscillating at the Larmor precession frequency for given nuclei, means for providing a signal representative of said Larmor precession of nuclei, and means providing indications of said signal.

11. Apparatus for investigating a well drilled into the earth, comprising a projectile adapted to be forced into the wall of the well, conduit means in the projectile accessible to fluid in the material comprising the wall of the well, magnet means for subjecting substances in said conduit means to a substantially constant magnetic field, means for subjecting said substances to wave energy, and means for providing a signal representative of Larmor precession of nuclei comprising said substances.

12. In apparatus for investigating a bore hole drilled into the earth, the combination of packer means mounted for movement through the bore hole, means for urging said packer means into engagement with the side wall of the bore hole, sample receiver means, means affording communication between the liquid contents of the formation engaged by said packer means and said sample receiver means, means for causing Larmor precession in nuclei having magnetic properties in said sample receiver means, means providing a signal representative to said Larmor precession of the nuclei, and means providing indications of said signal.

13. In a method for investigating a well drilled into the earth, the steps of subjecting nuclei having magnetic properties and comprising material in the well to a polarizing magnetic field, simultaneously subjecting said nuclei to high frequency compressional wave energy at an angle to said magnetic field, the frequency of said wave energy and the amplitude of said polarizing magnetic field being selected to cause Larmor precession in said nuclei, providing a signal representative of said Larmor precession of the nuclei, and obtaining indications of said signal.

14. In a method for detecting metals and metallic ores in the earth, the steps of subjecting earth material under examination to a polarizing magnetic field, while subjected to said polarizing field alternately subjecting said earth material to an alternating magnetic field at an angle to said polarizing magnetic field and at a frequency that will produce a Larmor precession for the spin of an electron, and inducing a nuclear magnetic resonance condition in a particular nuclear specie being sought, providing a signal representative of said nuclear magnetic resonance, and obtaining indications of said signal.

15. A method as defined in claim 14 in which the alternating field is pulsed with a period shorter than the spin relaxation time of the electron in the material.

16. A method as defined in claim 14 in which the alternating field is pulsed with a period shorter than the spin relaxation time of the electron in the material, and steady state indications are obtained from the nuclear magnetic resonance induced in the particular nuclear specie being sought.

17. In a method for investigating earth formation, the steps of causing at periodically recurring spaced intervals of time magnetic resonance in the electrons of a sample of said formation, causing nuclear magnetic resonance in nuclei being sought in said sample, providing at times intermediate said spaced intervals of time a signal representative of said last-named resonance, and obtaining indications of said signal.

18. In apparatus for investigating a bore hole drilled into the earth and containing a column of liquid, the combination of an enclosure adapted to be lowered into a well, conduit means carried by said enclosure communicating at both ends with the bore hole liquid, means for circulating bore hole liquid through said conduit means, magnet means in said enclosure and disposed so as to subject nuclei having magnetic properties in the fluid in said conduit means to a unidirectional magnetic field, coil means mounted in one arm of an impedance bridge and disposed so as to subject said nuclei to an alternating magnetic field directed at an angle to said unidirectional field, a source of constant frequency alternating current connected to energize said bridge, means for periodically sweeping the amplitude of said unidirectional field through a range including at least one value for which Larmor precession of said nuclei will occur, and means for providing indications of energy absorbed from said alternating field.

19. In apparatus for investigating a bore hole drilled into the earth, the combination of magnet means mounted for movement through the bore hole and disposed so as to subject nuclei having magnetic properties and comprising material in the well to a substantially constant magnetic field, coil means mounted in fixed relation to said magnet means for subjecting said nuclei to an alternating magnetic field directed at an angle to said constant field, means for sweeping the frequency of said alternating magnetic field through a range including the Larmor precession frequency for selected nuclei, amplitude selector means connected to receive a signal developed by said coil means, means responsive to said signal developed by said coil means for providing indications of the energy absorbed from said alternating field, and switching means operated in synchronism with said sweeping means for rendering said indicating means operative only during a selected portion of each sweep of said sweeping means.

20. In a method for investigating a well drilled into the earth, the steps of subjecting nuclei having magnetic properties and comprising material at a selected level in a well to a polarizing magnetic field, simultaneously subjecting said nuclei to an alternating magnetic field directed at an angle to said polarizing magnetic field, varying at least one of two quantities including the amplitude of said polarizing field and the frequency of said alternating field through a range including a value for which Larmor precession of selected nuclei will be sustained, said range being less than that represented by the spacing between the points of inflection of the resonance peak obtained from a plot of energy absorption vs. one of frequency and magnetic field strength, the other being held constant, producing a signal representative of said Larmor precession, and obtaining indications of said signal.

21. In apparatus for investigating a bore hole drilled into the earth, the combination of a cushion member mounted for movement through the bore hole, means for urging said cushion member into engagement with the wall of the bore hole to displace any liquid that may be present in the bore hole, means in said cushion member for mechanically shock exciting nuclei having magnetic properties and comprising material at a selected level in the bore hole to cause Larmor precession of said nuclei, means coupled to said cushion member for detecting the occurrence of said Larmor precession, means coupled to said detecting means for generating a signal representative of said Larmor precession, and means for providing an indication of said signal.

22. In apparatus for investigating a bore hole drilled into the earth, the combination of packer means mounted for movement through the bore hole, means for urging said packer means into engagement with the side wall of the bore hole, sample receiver means, means affording communication between the fluid contents of the formation engaged by said packer means and said receiver means for obtaining a sample of the formation fluid, means for producing nuclear resonance effects in nuclei having magnetic properties in said obtained sample, means providing a signal representative of said nuclear resonance effects produced in the nuclei, and means providing indications of said signal.

23. In a method for investigating a well drilled into the earth and containing drilling mud, the steps of adding paramagnetic ions to said drilling mud, causing at periodically recurring spaced intervals of time magnetic resonance in the electrons of a sample of material at a selected level in the well, causing nuclear magnetic resonance in nuclei being sought in said sample, providing at times intermediate said spaced intervals of time a signal representative of said last named resonance, and obtaining indications of said signal.

24. In a method for investigating a well drilled into the earth to detect the presence of carbon 13, the steps of subjecting nuclei having magnetic properties and comprising material at a selected level in a well to a polarizing magnetic field, simultaneously subjecting said nuclei to an alternating magnetic field directed at an angle to said polarizing magnetic field, varying at least one of two quantities including the amplitude of said polarizing field and the frequency of said alternating field through a range including a value for which Larmor precession of nuclei of carbon of atomic weight 13 will be sustained, said range being less than that represented by the spacing between the points of inflection of the resonance peak obtained from a plot of energy absorption vs. one of frequency and magnetic field strength, the other being held constant, producing a signal representative of said Larmor precession, and obtaining indications of said signal.

References Cited

UNITED STATES PATENTS

| | | | |
|---|---|---|---|
| Re. 23,769 | 1/1954 | Varian | 324—0.5 |
| 3,289,072 | 11/1966 | Schuster | 324—0.5 |
| 2,756,383 | 7/1956 | Nold | 324—0.5 |
| 2,018,080 | 10/1935 | Martienssen | 324—5 |
| 2,167,630 | 8/1939 | Bazzoni et al. | 324—5 |
| 2,535,666 | 12/1950 | Broding | 324—5 |
| 2,561,489 | 7/1951 | Block et al. | 324—35 X |
| 3,213,354 | 10/1965 | Baker | 324—0.5 |

OTHER REFERENCES

"Free Nuclear Induction," E. L. Hahn, Physics Today, vol. 6, No. 11, November 1953, pp. 4–9.

Carver et al.: Physical Review, vol. 92, No. 1, pp. 212–213, Oct. 1, 1953.

Darrow: Electrical Engr., vol. 70, No. 5, pp. 401–404, May 1951.

RUDOLPH V. ROLINEC, Primary Examiner

M. J. LYNCH, Assistant Examiner

PO-1050
(5/69)

UNITED STATES PATENT OFFICE
CERTIFICATE OF CORRECTION

Patent No. 3,528,000          Dated Sept. 8, 1970

Inventor(s)        Harold F. Schwede

It is certified that error appears in the above-identified patent and that said Letters Patent are hereby corrected as shown below:

Col. 1, line 5, "Schlumberger Well Surveying Corporation" should be --Schlumberger Technology Corporation--; Col. 1, line 23, "itended" should be --intended--; Col. 1, line 44, "processing" should be --precessing--; Col. 3, line 58, "This" should be "The--; Col. 3, line 61, "an" should be --in--; Col. 3, line 63, "fraquency" should be --frequency--; Col. 4, line 1, "instance" should be --instant--; Col. 5, lines 37, 38, "process" should be --precess--; Col. 5, line 65, "f=0.763µi/H" should be --f=0.763µH/i--; Col. 5, line 68, "as" should be --is--; Col. 6, line 47, "potental" should be --potential--; Col. 7, line 20, "driven" should be --drive--; Col. 8, line 19, "depths" should be --depth--; Col. 9, line 2, "desigated" should be --designated--; Col. 11, line 9, after "hydrogen" insert --nucleus--; Col. 13, line 8, "indicatod" should be --indicator--; Col. 13, line 64, "auxiilary" should be --auxiliary--; Col. 18, line 17, after "No. 2,788,483," insert --issued April 9, 1957--; Col. 18, line 52, "sterngth" should be --strength--; Col. 20, line 64, "Kg/s" should be --Kc/s--; Col. 23, line 27, after "energy" insert --at an angle to said constant magnetic field--; Col. 23, line 39, cancel "to" and insert --of--; Col. 26, line 10 (references cited) insert the following: --2,259,904 10/1941 McNamee et al; 2,401,280 5/1946 Walstrom; Col. 26, line 20 (other references) insert the following: --Bloembergen et al, *Physical Review*, Vol. 73, no. 7, Apr. 1, 1948, pp. 679-712; "Fundamentals of Nuclear Magnetic Resonance Absorption" G.E. Pake, *American Journal of Physics*, Vol. 18, No. 7, pp. 438-452, Oct. 1950; "Nuclear Induction" F. Block, *Physical Review*, Vol. 70, # 7 & 8, pp. 460-473, Oct. 1946; "Spin Echoes" E.L. Hahn, *Physical Review*, Vol. 80, #4, pp. 580-593, Nov. 1950--;

Signed and sealed this 15th day of June 1971.

(SEAL)
Attest:

EDWARD M. FLETCHER, JR.
Attesting Officer

WILLIAM E. SCHUYLER, JR.
Commissioner of Patents